(No Model.)
H. TIMKEN.
VEHICLE SPRING.
No. 487,201. Patented Nov. 29, 1892.
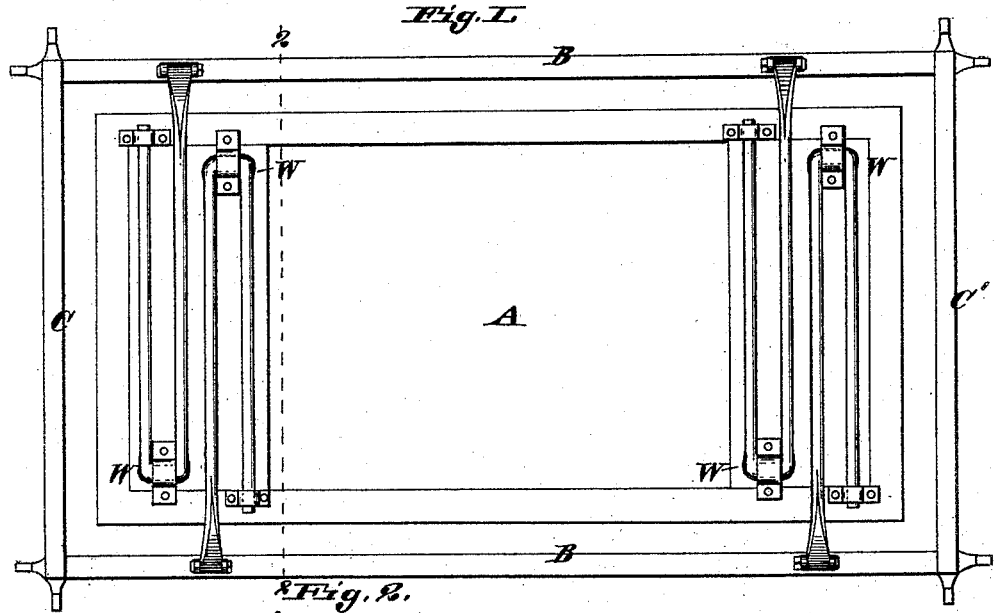
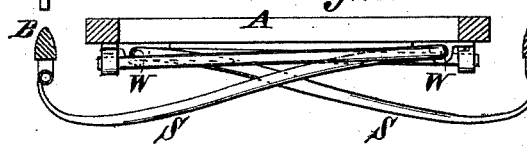
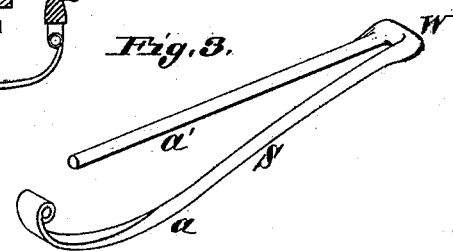
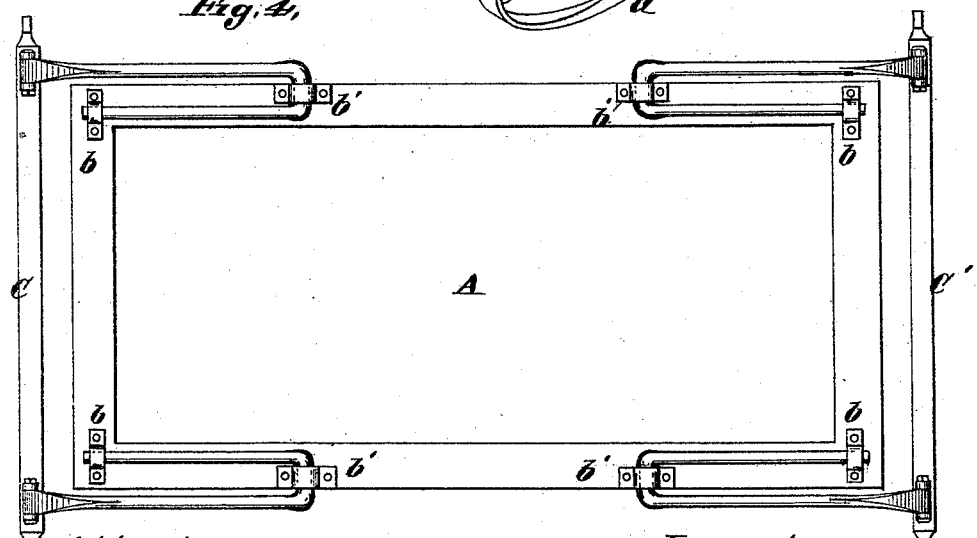
Attest:
Wm M Eccles
H. H. Timken.
Inventor:
Henry Timken

UNITED STATES PATENT OFFICE.

HENRY TIMKEN, OF SAN DIEGO, CALIFORNIA.

VEHICLE-SPRING.

SPECIFICATION forming part of Letters Patent No. 487,201, dated November 29, 1892.

Application filed June 25, 1891. Serial No. 397,526. (No model.)

*To all whom it may concern:*

Be it known that I, HENRY TIMKEN, a citizen of the United States, residing at the city of San Diego, State of California, have invented certain new and useful Improvements in Vehicle-Springs, of which the following is a specification, reference being had to the accompanying drawings.

My invention relates to vehicle-springs, and has for its principal objects practically to avoid torsion and crystallization of the wrist portion and to provide a vehicle-spring which has advantages in construction and in operation and in combination with a vehicle over other springs.

To these ends my invention consists, mainly, in a spring having a wrist portion free from torsion, together with laterally-extending flexible arms, as hereinafter described.

It also consists, in the combination hereinafter described, of a spring composed of a wrist portion and lateral arms with the vehicle in such a way as to allow free spring action of the arms; and it further consists in the construction and combination of parts hereinafter described and claimed.

In the accompanying drawings, forming part of this specification, Figure 1 is a plan view of the under side of a side-bar vehicle with my springs attached. Fig. 2 is a vertical transverse sectional view of the same, taken on the line 2 2 of Fig. 1. Fig. 3 is a view of one of my springs detached. Fig. 4 is a plan view of the under side of a vehicle with my spring attached to the head-block and hind axle.

My spring consists of a wrist portion W, having flexible arms *a a'* extending laterally therefrom, preferably in approximately-parallel planes. Preferably the spring is made of a single bar of steel, a short portion of which is considerably larger in section than the portion near each end. The intermediate thick portion constitutes the wrist, and the bar is bent at each end of this wrist to form the flexible lateral arms. The thickness of the wrist portion should be such that the force required to be applied at the ends of the arms to flex those arms to their respective limits in practice will cause no appreciable torsion in the wrist. The wrist is of course not absolutely free from torsion, and I hereby define the phrase "free from torsion," as herein applied to the wrist, to mean that a force applied to the ends of the arms will flex those arms to their limits without any appreciable twisting of the wrist. The wrist portion is preferably short, so that the arms are close together. When applied to a vehicle, these arms are not far from the same vertical plane, so that those strains are reduced which in practice tend to work the bearings loose from the vehicle. The arms may extend from the wrist in the same or opposite directions; but for obvious reasons it is better that they should extend in the same direction. As this modification, where the arms extend in opposite directions and the manner of securing it to the vehicle are obvious, I deem it unnecessary to describe and illustrate them in detail.

The springs S are attached to the bottom of the body A of the vehicle by means of a journal or bearing on the under side of said bottom, which journal supports the wrist and in which the wrist is free to turn. The end of one arm *a* of each spring rests against the under side of the body or against the bearing specially provided therefor and projecting some distance below said body. The other arm *a'* is longer and slightly curved upward and is connected at its end to the running-gear of the vehicle. The springs may be arranged so that the arms extend transversely to the body, in which case the longer arms are connected to the side bars B, as shown in Fig. 1, or the arms may extend longitudinally with said body, in which case the longer arms are connected to the hind axle C' and head-block C or to the end springs, as may be desired, as shown in Fig. 4.

The operation of the device is as follows: The weight of the body is supported by the flexible arms connected to the running-gear. When the weight is increased, the supporting-arms are flexed, allowing the body to lower, and at the same time the wrist portion of each spring turns in its bearing. The turning of the wrist portion carries with it the end of the short arm *a*, fixed thereto or integral therewith. The outer end of the short arm rests against the under side of the body or against a projecting bearing thereon, so that the turning of the wrist causes this arm to flex, thereby causing the free end to move slightly toward the wrist. In order to allow this flexion, the outer end should be free to slide to and fro slightly in the direction of its length and its intermediate portion should be slightly removed from the vehicle-body. Favorable results have been reached even when the outer ends of the free arms are fastened to the body, which seem to be due to the elasticity of the metal permitting the arms to elongate. The function of the short arm is to relieve the longer arm and the wrist from great strains and at the same time to hold the wrist against too free rotation.

My invention is not limited to a construction wherein the wrist is thicker than the transversely-extending arms, but covers, also, constructions wherein the wrist has been rendered relatively free from torsion by any known means—as, for instance, by drawing the temper of the wrist.

What I claim is—

1. The combination, with the running-gear and body of a vehicle, of a spring consisting of a wrist portion journaled to said body and flexible arms united to said wrist portion and extending laterally therefrom, the outer end of one of said arms being attached to the said running-gear and the second arm being movably connected to said body, substantially as described.

2. The combination, with the running-gear and body of a vehicle, of a spring consisting of a rigid wrist portion journaled to said body and flexible arms united to said wrist portion and extending laterally therefrom, the outer end of one of said arms being attached to said running-gear and the outer end of the other arm resting on a bearing projecting from the under side of said body, substantially as described.

HENRY TIMKEN.

Attest:
FRANCIS VALLÉ,
F. A. SIEFERT.